United States Patent
Chang et al.

(10) Patent No.: US 11,056,906 B2
(45) Date of Patent: Jul. 6, 2021

(54) INTEGRATED POWER SUPPLY SYSTEM

(71) Applicant: DELTA ELECTRONICS, INC., Taoyuan (TW)

(72) Inventors: Yu-Ming Chang, Taoyuan (TW); Sheng-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 280 days.

(21) Appl. No.: 16/014,974

(22) Filed: Jun. 21, 2018

(65) Prior Publication Data
US 2019/0081506 A1 Mar. 14, 2019

Related U.S. Application Data

(60) Provisional application No. 62/557,085, filed on Sep. 11, 2017.

(51) Int. Cl.
*H02J 9/06* (2006.01)
*H02J 3/38* (2006.01)
*H02J 3/32* (2006.01)

(52) U.S. Cl.
CPC .......... *H02J 9/06* (2013.01); *H02J 3/32* (2013.01); *H02J 3/382* (2013.01); *H02J 9/062* (2013.01)

(58) Field of Classification Search
CPC ...... H02J 1/10; H02J 3/32; H02J 3/382; H02J 7/34; H02J 9/06; H02J 9/062
See application file for complete search history.

(56) References Cited

U.S. PATENT DOCUMENTS

| | | | |
|---|---|---|---|
| 2014/0207305 A1 | 7/2014 | Zhang et al. | |
| 2015/0270787 A1* | 9/2015 | Fujisaki | G05F 1/61 363/41 |
| 2016/0043628 A1* | 2/2016 | Chiang | H02M 1/36 363/53 |
| 2016/0128231 A1* | 5/2016 | Wagoner | H05K 7/20927 165/104.31 |
| 2016/0352105 A1* | 12/2016 | Tiwari | H02J 1/102 |
| 2017/0093162 A1* | 3/2017 | Inoue | H02J 3/382 |

(Continued)

FOREIGN PATENT DOCUMENTS

| | | |
|---|---|---|
| CN | 203883473 U | 10/2014 |
| CN | 205970910 U | 2/2017 |

(Continued)

*Primary Examiner* — Rexford N Barnie
*Assistant Examiner* — Elim Ortiz
(74) *Attorney, Agent, or Firm* — Muncy, Geissler, Olds & Lowe, P.C.

(57) ABSTRACT

An integrated power supply system includes a grid power source, at least one renewable power source, a rechargeable battery assembly, a DC bus, a bi-directional AC-to-DC converter, at least one first DC-to-DC converter, a bi-directional DC-to-DC converter, and a controller. The bi-directional AC-to-DC converter is coupled to the grid power source and the DC bus. The at least one first DC-to-DC converter is coupled to the at least one renewable power source and the DC bus. The bi-directional DC-to-DC converter is coupled to the rechargeable battery assembly and the DC bus. The controller controls power electricity feeding into and being drawn from the DC bus, thereby keeping a bus voltage of the DC bus substantially fixed at a system voltage.

15 Claims, 16 Drawing Sheets

(56) References Cited

U.S. PATENT DOCUMENTS

2017/0366011 A1* 12/2017 Li ........................ H02J 3/381
2019/0326752 A1* 10/2019 Kikuchi ................ H02J 1/102

FOREIGN PATENT DOCUMENTS

| TW | 2014-31237 A | 8/2014 |
| TW | 2017-11340 A | 3/2017 |
| TW | 2017-42351 A | 12/2017 |

* cited by examiner

INTEGRATED POWER SUPPLY SYSTEM

BACKGROUND

Technical Field

The present disclosure relates to an integrated power supply system, and more particularly to an integrated power supply system applied to residential buildings and/or electric vehicles.

Description of Related Art

The statements in this section merely provide background information related to the present disclosure and do not necessarily constitute prior art.

For the existing power supply system, the household electricity, which is transmitted and distributed from the power grid, is mainly powered by the AC power source through wall sockets. For example, a single-phase three-wire (1P3 W) 240-volt AC voltage at 60 Hz, which may supply electricity to air conditioners or other electrical appliances. Until now, however, no DC electricity is directly supplied from a wall outlet in the household to provide power for the home appliances.

SUMMARY

An objective of the present disclosure is to provide an integrated power supply system to solve the problem of failing to directly supply both DC electricity and AC electricity from DC wall sockets and AC wall sockets in the household.

In order to achieve the above-mentioned objective, the integrated power supply system includes a grid power source, at least one renewable power source, a rechargeable battery assembly, a DC bus, a bi-directional AC-to-DC converter, at least one first DC-to-DC converter, a bi-directional DC-to-DC converter, and a controller. The bi-directional AC-to-DC converter is coupled to the grid power source and the DC bus. The at least one first DC-to-DC converter is coupled to the at least one renewable power source and the DC bus. The bi-directional DC-to-DC converter is coupled to the rechargeable battery assembly and the DC bus. The controller controls power electricity feeding into and being drawn from the DC bus, thereby keeping a bus voltage of the DC bus substantially fixed at a system voltage.

Accordingly, the integrated power supply system is provided to directly supply both DC electricity and AC electricity from DC wall sockets and AC wall sockets in the household, thereby increasing the convenience and flexibility of electricity usage.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
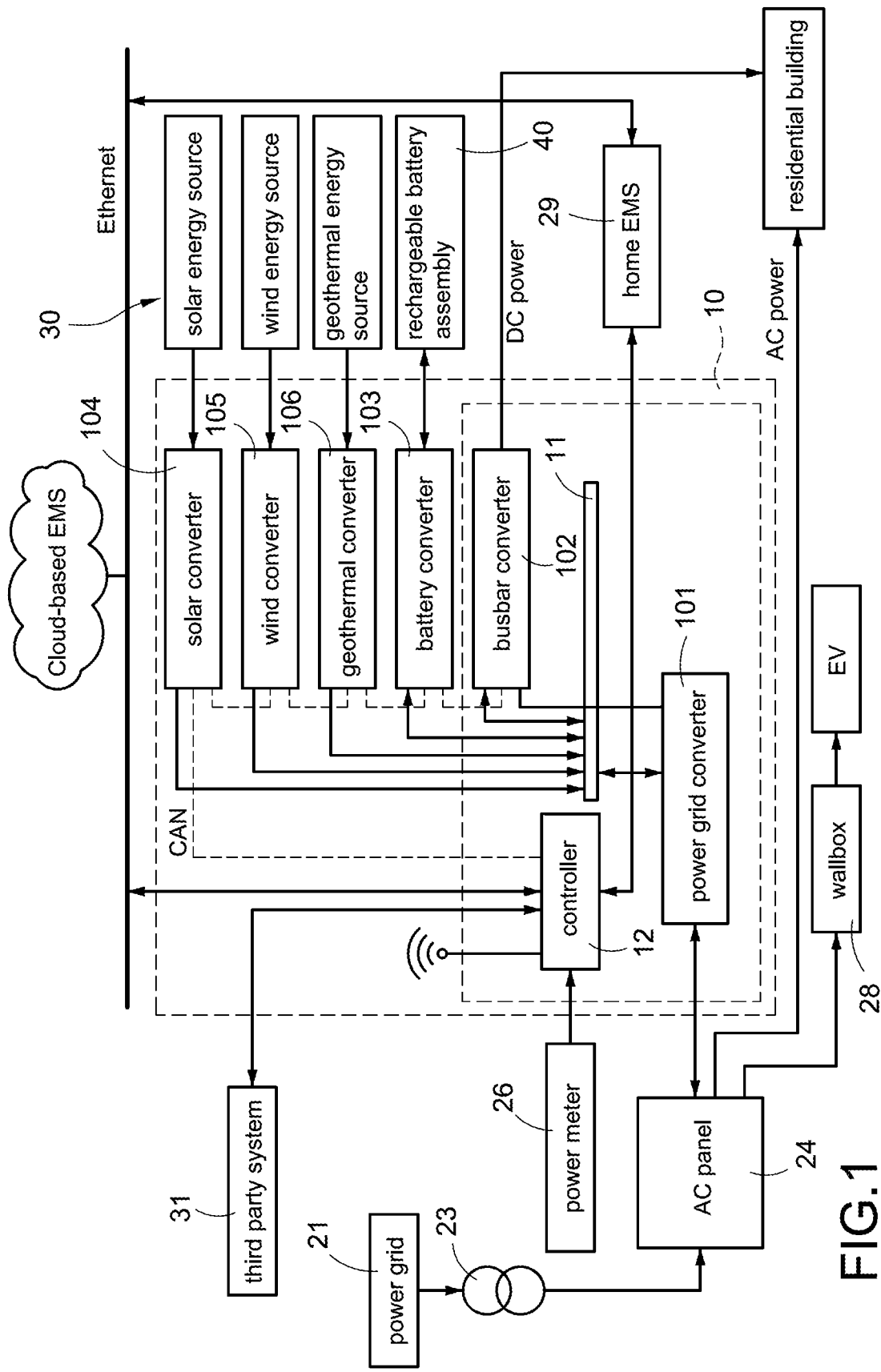
FIG. 1 is an architecture view of an integrated power supply system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows an architecture view and a detail circuit block diagram of an integrated power supply system for a residential building according to the present disclosure, respectively. The integrated power supply system 100 including a grid power source 21 (hereinafter referred to as "power grid 21"), at least one renewable power source 30, and a battery assembly with a plurality of rechargeable batteries installed in a battery cabinet shown in FIG. 4 (hereinafter referred to as "rechargeable battery" or "battery") is coordinately applied to supply the required alternating-current (AC) power and direct-current (DC) power to households in the residential building. In this embodiment, the at least one renewable power source 30 can be, for example but not limited to, a solar energy source, a wind energy source, a geothermal energy source, a hydraulic energy source, and so on. In this example, the residential building with six floors having 12 households is exemplified for further demonstration. Correspondingly, if the number of the households in a residential building is added, the scale of the power electricity supplied from the integrated power supply system 100 is increased without changing the architecture of the integrated power supply system 100.

Figure 2:
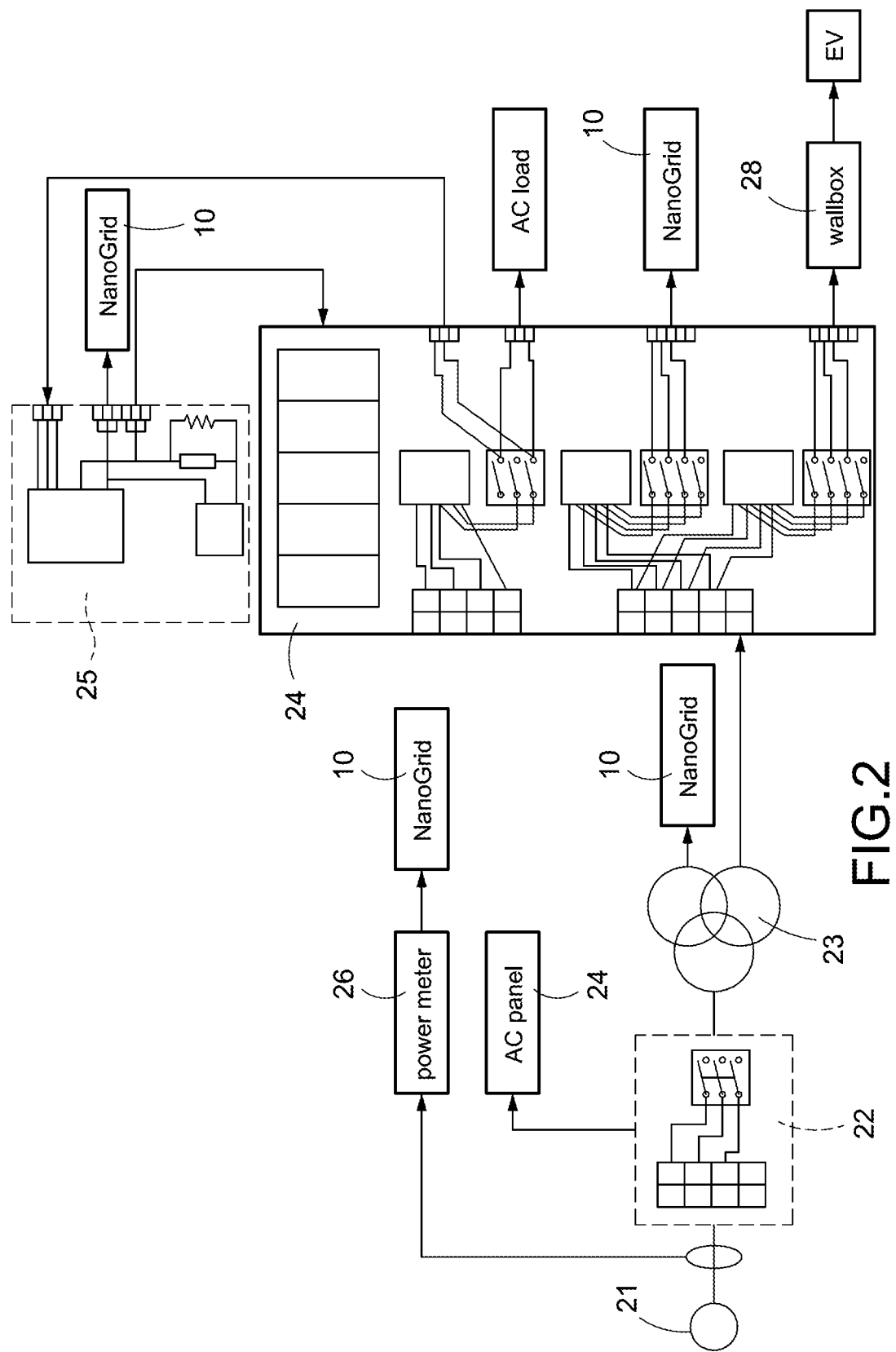
FIG. 2 is a circuit block diagram of an AC input power source and an AC distribution panel according to the present disclosure.

In the present disclosure, an AC mains source mainly involves the power grid 21, an AC breaker 22, and an AC transformer 23 shown in FIG. 2. The AC breaker 22 is controlled by a tripping signal to determine whether the power electricity generated from the power grid 21 is transmitted to an AC panel 24 shown in FIG. 2. The AC transformer 23 is used to transform the voltage level of the power electricity and transmit the transformed power electricity to the AC panel 24 or a NanoGrid system 10 (hereinafter referred to as "NanoGrid 10" and described in detail). Also, the AC transformer 23 can be a delta-to-wye configuration for transforming either a three-phase three-wire (3P3 W) power supply into a 3P4 W power supply or a 1P2 W power supply. The detailed description of the AC transformer 23 will be made hereinafter with reference to FIG. 9A and FIG. 9B.

As shown in FIG. 2, the integrated power supply system 100 further provides a black start mechanism for bootstrapping the power grid 21 into operation once the power grid 21 is not available, and therefore a block start box 25 integrated in the system plays a significant role of re-starting the power grid 21. The AC panel 24 provides a plurality of input ports and output ports, and the plurality of input ports are mainly used to receive different voltage levels of the supply power from the AC transformer 23 at the power grid side and the plurality of output ports are used to connect with different converters, customer loads, an EV (electric vehicle) charger (charging station), the black start box 25, and so on.

For the existing power supply system, the household electricity, which is transmitted and distributed from the power grid 21, is mainly powered by the AC power source through wall sockets. For example, a single-phase three-wire (1P3 W) 240-volt AC voltage at 60 Hz, which may supply electricity to air conditioners or other electrical appliances. However, no DC power source is directly supplied from wall sockets for DC loads in the household until now. Accordingly, the integrated power supply system 100 of the present disclosure proposes such requirement for combination of the AC electricity and the DC electricity directly supplied from wall sockets for AC loads and DC loads, such as LED lighting products in the households. In particular, in this integrated power supply system 100 of the present disclosure, a safe DC voltage can be supplied from wall sockets in each household. For example, the safe DC voltage can be less than or equal to 60 volts, which meets requirements of certain safety standards.

In general, the production of electricity from renewable power sources 30 is highly unstable, especially as solar energy, wind energy, geothermal energy, and hydraulic energy strongly depend on weather and climate conditions. Hence, a backup or standby electricity is usually necessary for emergent and urgent situations to strengthen and improve intermittency and unpredictability of the renewable power sources 30.

Figure 3:
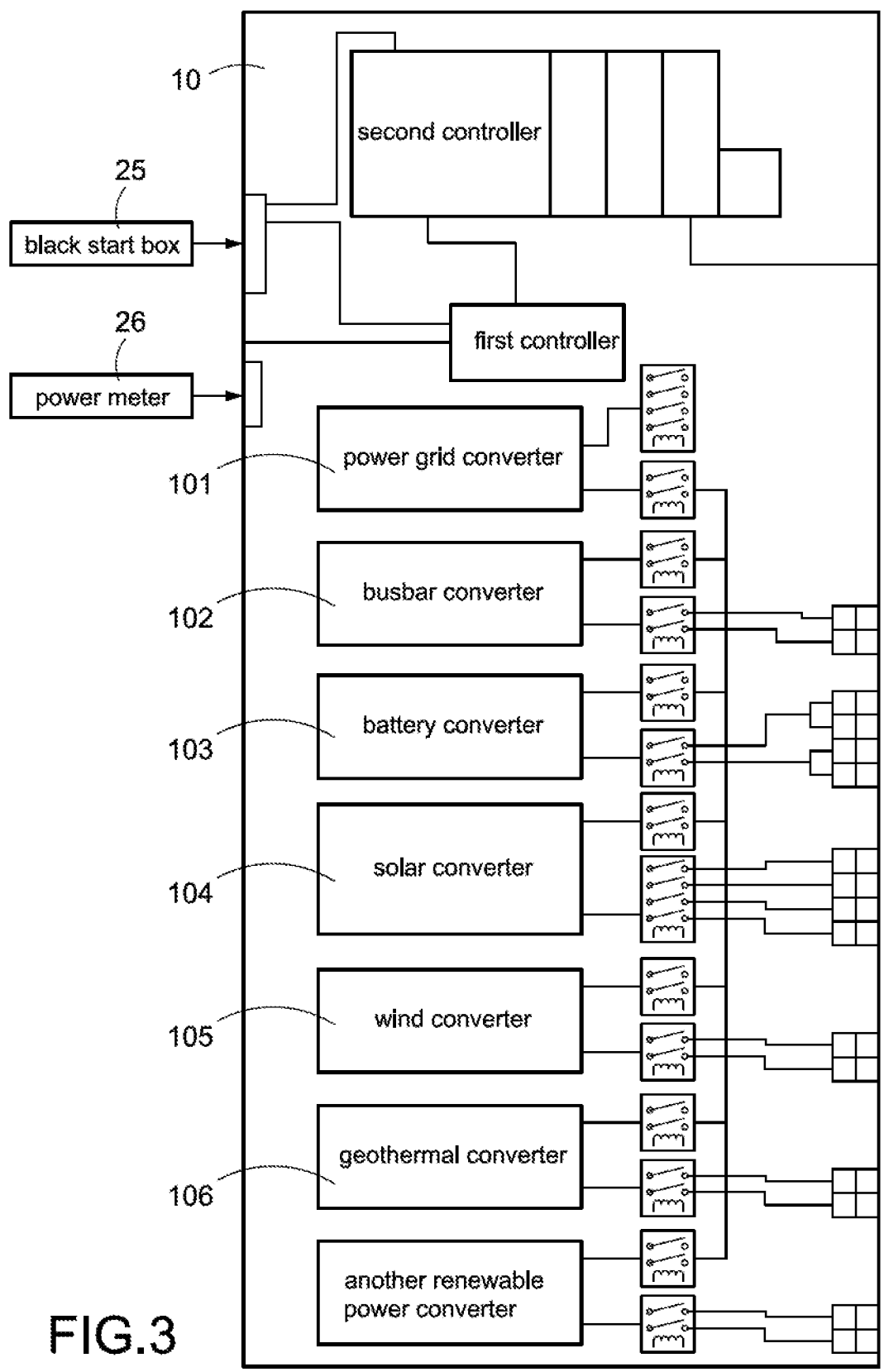
FIG. 3 is a circuit block diagram of a NanoGrid system according to the present disclosure.

In the present disclosure, each residential building is equipped with only one NanoGrid 10, and the NanoGrid 10 is usually installed in a distribution room or a substation room of the residential building. Also, the AC electricity outputted from NanoGrid 10 is delivered to a power distribution panel of each of the households, and then supplies AC loads in the households. The detailed circuit block diagram of NanoGrid 10 is shown in FIG. 3, and the detailed description of NanoGrid 10 will be made hereinafter.

As shown in FIG. 1, a power grid converter 101, such as a 50 kW bi-directional AC/DC converter is used to convert an AC power delivered from an AC distribution panel 24 (hereinafter referred to as "AC panel 24") located outside the residential building into a DC power source. Also, the DC power source is fed into a DC busbar 11 (hereinafter referred to as "busbar 11") in the NanoGrid 10, and a busbar voltage of the busbar 11 is, for example but not limited to, 800 volts. In particular, the watt values, voltage values, and other electrical parameter values described in the present disclosure are only for illustrative purposes but not intended to limit the present invention.

In one embodiment, the busbar voltage of the busbar 11 is converted by a busbar converter 102, such as a 10 kW DC/DC converter installed in the NanoGrid 10 to step the busbar voltage down from 800 volts DC to 60 volts DC. Also, the 60-volt DC power source is delivered to each of the households in the residential building, and therefore the 60-volt DC power source can be directly supplied from wall sockets of each household for DC loads, such as DC electrical appliances in the household. In particular, the DC electrical energy generated from these renewable power sources 30 including the solar energy source, the wind energy source, the geothermal energy source, the hydraulic energy source, and so on can be directly fed into the busbar 11.

Figure 4:
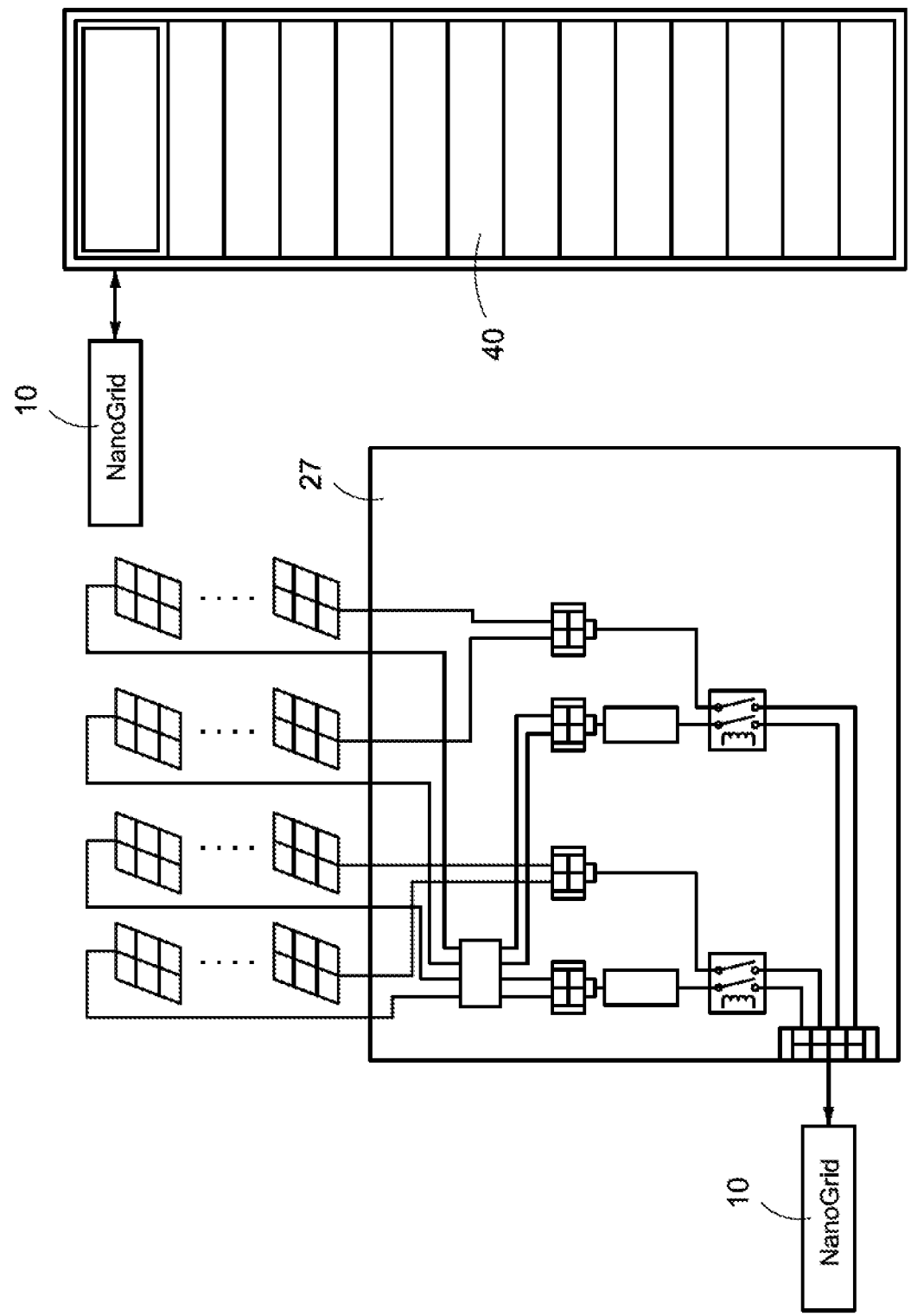
FIG. 4 is a circuit block diagram of a combiner box and a battery cabinet according to the present disclosure.

Also refer to FIG. 4, a combiner box 27 is provided to bring the power electricity outputted from several solar strings together. In one embodiment, a solar array is built up by 4 string and 25 solar panels per string. Moreover, the rechargeable battery is designed for bi-directional power flow, namely the power can flow in either direction between the busbar 11 and the rechargeable battery through a battery converter 103, such as a 50 kW bi-directional DC/DC converter installed in the NanoGrid 10. In other words, the rechargeable battery can perform in bi-directional operations.

The sources of the DC electricity feeding into the busbar 11 could be the DC power source converted from the power grid 21 by the power grid converter 101, namely the 50 kW bi-directional AC/DC converter, the electrical energy generated from these renewable power sources 30, and the electrical energy outputted from the rechargeable battery. On the contrary, the sources of the DC electricity being drawn from the busbar 11 could be the DC loads in the household and the electrical energy outputted to the rechargeable battery. Also, when electricity (current) drawn by loads, such as household appliances in the household and no DC electricity is fed into the busbar 11, the busbar voltage of the busbar 11 would be gradually reduced.

In the NanoGrid 10, a controller 12 is essential to coordinate the electricity supply and demand in this integrated power supply system 100 in order to ensure electricity balancing of the integrated power supply system 100.

More specifically, the power electricity generated from the power grid 21 to supply to the NanoGrid 10 is substantially stable and large, and therefore it can dominate the variation of the busbar voltage, such as 800 volts, of the busbar 11 when the power grid 21 is abundant and stable. In this embodiment, the power electricity generated from the power grid 21 may be measure by a meter, such a smart meter (power meter 26) and the measured electricity information is transmitted from the meter to NanoGrid 10 by RS485 communication bus as shown in FIG. 2.

At this condition, the power electricity generated from the renewable power source 30 or outputted from the rechargeable battery is less influential than that. Once the power grid 21 fails or is unavailable, however, the power electricity generated from the renewable power source 30 or outputted from the rechargeable battery is greatly affect the variation of the busbar voltage of the busbar 11. Accordingly, it is essential for the controller 12 to monitor, control, and regulate the busbar voltage of the busbar 11 between feeding electricity and drawn electricity by collecting and analyzing electricity information provided from the power grid 21, the renewable power sources 30, and the rechargeable battery.

For example, when the busbar voltage drops down to less than 780 volts, the controller 12 controls the at least one renewable power source 30 which has the highest priority or the rechargeable battery which has the second high priority to feed the DC electricity into the busbar 11, thereby gradually pulling the busbar voltage up to 800 volts. At this condition, the DC electricity converted from the power grid 21 may not feed into the busbar 11. However, once the busbar voltage continuously drops down to less than 750 volts in the presence of the renewable power sources 30 and/or the rechargeable battery, the DC electricity converted from the power grid 21 is activated to feed into the busbar 11 to dramatically step the busbar voltage up to 800 volts.

In other words, when the busbar voltage drops down to less than a first threshold voltage, such as the 780 volts, the controller 12 controls renewable power converters with the highest priority converting the renewable power sources 30 into the DC electricity fed into the busbar 11. The first threshold voltage is less than a system voltage, such as the 800 volts. Alternatively, when the busbar voltage drops down to less than the first threshold voltage, the controller 12 controls the battery converter 103 with the second high priority converting the DC electricity outputted from the rechargeable battery into the DC electricity fed into the busbar 11. Further, when the busbar voltage drops down to less than a second threshold voltage, such as the 750 volts, the controller 12 controls the power grid converter 101 converting the power electricity generated from the power grid 21 into the DC electricity fed into the busbar 11.

In particular, the DC electricity drawn from the busbar 11 by the loads in the households cannot be controlled. The renewable power source 30 or the rechargeable battery has higher priority than the power grid 21 to feed the DC electricity into the busbar 11 and pull up the busbar voltage when the busbar voltage dramatically drops due to heavy electricity usage of the households. However, the power grid 21 is activated to feed into the busbar 11 to dramatically step the busbar voltage up once the renewable power source 30 or the rechargeable battery fails to continuously pull up the busbar voltage resulting in an excessive voltage drop. At this condition, the renewable power source 30 or the rechargeable battery may secondarily feed the DC electricity into the busbar 11 when the DC electricity converted from the power grid 21 is fed into the busbar 11.

In addition, the integrated power supply system 100 has an uninterruptible power function by using the rechargeable battery. More specifically, the rechargeable battery is used to provide the emergency backup electricity to supply the required AC power and DC power to the households in the residential building when the power grid 21 and the all renewable power sources 30 are not available, or the power grid 21 is not available and the all renewable power sources 30 fail to support enough electricity.

As shown in FIG. 1, the DC power is supplied from the rechargeable battery to the households. More specifically, the DC electricity outputted from the rechargeable battery is converted by the battery converter 103, namely the 50 kW bi-directional DC/DC converter installed in the NanoGrid 10 and then delivered to the busbar 11. Afterward, the busbar converter 102, namely the 10 kW DC/DC converter is used to convert the DC power provided from the busbar 11 and then deliver the converted DC power to supply the DC loads in the households.

In addition, the AC power is supplied from the rechargeable battery to the households. More specifically, the DC electricity outputted from the rechargeable battery is converted by the battery converter 103, namely the 50 kW bi-directional DC/DC converter installed in the NanoGrid 10 and then delivered to the busbar 11. Afterward, the power grid converter 101, namely the 50 kW bi-directional AC/DC converter is used to convert the DC power provided from the busbar 11 into an AC power and then deliver the converted AC power to the AC distribution panel located outside the residential building. Afterward, the AC power outputted from the AC distribution panel could be converted into a DC power for electric vehicles by a power converter included in a wallbox 28, such as a 25 kW AC/DC converter or could be delivered to supply the AC loads in the households.

More specifically, when the busbar voltage of the busbar 11 is substantially maintained at 800 volts, the controller 12 may control the available DC electricity converted from the power grid 21 and/or the renewable power sources 30 to charge the rechargeable battery, thereby fully charging the rechargeable battery. Since costs of generating electricity from the renewable power sources 30 are relatively lower than that from the power grid 21, the renewable power sources 30 have higher priority than the power grid 21 to provide the available DC electricity to charge the rechargeable battery, thereby lowering generation costs, increasing utilization of renewable power sources 30, and increasing reliability of the integrated power supply system 100. However, the rechargeable battery is charged by the available DC electricity converted from the power grid 21 once electricity productions of the renewable power sources 30 are limited to fail to support enough electricity. For example, the electricity production of the solar energy source or that of the wind energy source is affected due to poor weather condition so that the electricity production of the solar energy source or that of the wind energy source is limited to fail to support enough electricity.

For example, when the busbar voltage of the busbar 11 is substantially maintained at 800 volts and the amount of the DC electricity drawn from the busbar 11 by the loads in the households is relatively little, the rechargeable battery could be charged against unexpected needs. In other words, the rechargeable battery could be charged as full as possible for emergency backup electricity.

In other words, if the rechargeable battery is not full under the maintained busbar voltage and the little amount of DC electricity drawn from the busbar 11, the rechargeable battery has higher priority to be fully charged. When the busbar voltage dramatically drops due to heavy electricity usage of the households, the power grid 21 has higher priority to be activated to feed into the busbar 11 to dramatically and rapidly pull the busbar voltage up to 800 volts.

By a controller area network (CAN or CANbus) shown as green lines in FIG. 1, the controller 12 acquires real-time electricity information, such as, for example but not limited to, electricity production of the power grid 21, these renewable power sources 30, the rechargeable battery, and battery capacity of the rechargeable battery. Moreover, the controller 12 could provide the acquired real-time electricity information to a cloud-based energy management system (EMS) or a home EMS 29 by a wireless manner, such as Wi-Fi, ZigBee, Bluetooth, or so on or by a wired manner, such as Ethernet. Also, the controller 12 could provide the acquired real-time electricity information to a mobile device, such as portable electronic device or wearable electronic device, which can monitor and realize the real-time electricity information for a user of the mobile device through an application program (APP). In addition, the controller 12 could provide the acquired real-time electricity information to an external third party system 31 for data exchange or data monitor by a serial interface (port), such as RS485, RS232, RS422, or so on or by a parallel interface (port).

Moreover, an AC power delivered from the AC distribution panel located outside the residential building could be converted into a DC power for electric vehicles by an EV charger, namely the power converter included in the wallbox 28 or a charging station. Further, the DC power for electric vehicles could be directly outputted from the NanoGrid 10 through another power converter installed in the NanoGrid 10 for supplying the required charging power to the electric vehicles.

In the present disclosure, two types of hardware configurations of NanoGrid 10 are proposed as follows. Please refer to FIG. 5, which shows a schematic block diagram of a hardware configuration of NanoGrid 10 according to a first embodiment (first type) of the present disclosure. Please refer to FIG. 7, which shows a schematic block diagram of a hardware configuration of NanoGrid 10 according to a second embodiment (second type) of the present disclosure.

Figure 5:
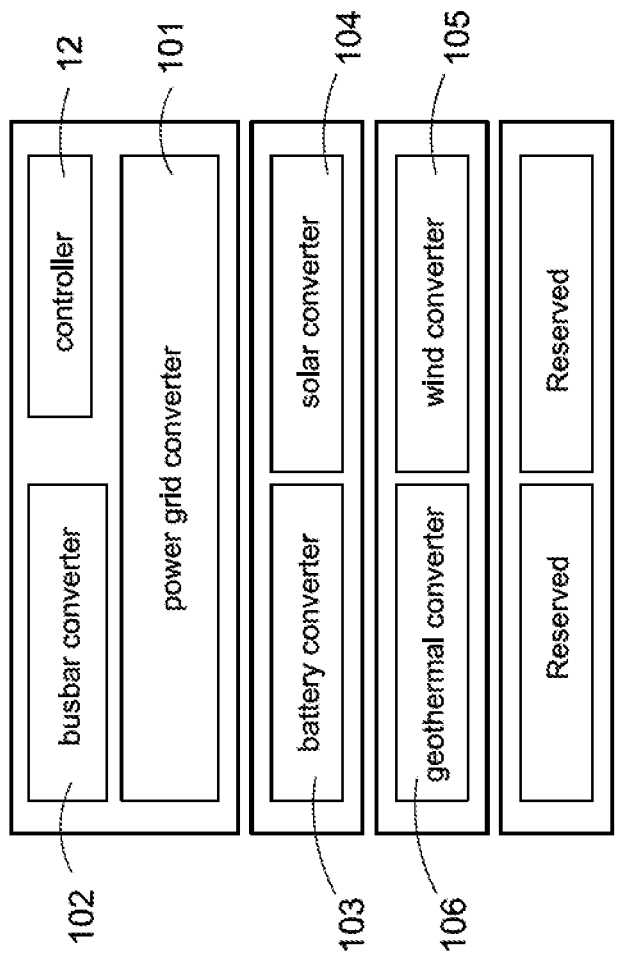
FIG. 5 is a schematic block diagram of the NanoGrid system according to a first embodiment of the present disclosure.

Preferably, the first type of NanoGrid 10 is housed in a cabinet having a plurality of shelves with dimension of, for example but not limited to, 620 mm(W)×600 mm(H)×1000 mm(D). A power grid converter 101, namely the 50 kW bi-directional AC/DC converter is installed in the cabinet, and available space of the power grid converter 101 is designed to be with dimension of, for example but not limited to, 17 in(W)×3 U(H)×28 in(D), where 1 U (one unit) is equal to 1.75 inches (44.45 mm). In particular, the dimension values of the cabinet described in the present disclosure are not intended to limit the present invention. In addition, six predetermined spaces are designed in a two-column arrangement to install a plurality of power converters, such as a solar converter 104, a wind converter 105, and a geothermal converter 106 for different renewable power sources 30 and a battery converter 103 for the rechargeable battery. As shown in FIG. 5, for example, four 2 U-height power converters are provided for the solar energy source, the wind energy source, the geothermal energy source, and the rechargeable battery, respectively. In this embodiment, the battery converter 103 for the rechargeable battery is a 50 kW bi-directional DC/DC converter, and other converters, including the solar converter 104, the wind converter 105, and the geothermal converter 106 for these renewable power sources 30 are single-directional DC/DC converters. In addition, two predetermined spaces are reserved or two DC/DC converters installed in the two predetermined spaces are reserved for other renewable power sources 30.

Moreover, another predetermined space is designed to install a busbar converter 102, namely the 10 kW DC/DC converter for DC loads in the household. Also, the controller 12 is housed in the limited available space of the cabinet.

In this embodiment, each of the power converters including the DC/DC converters and the AC/DC converter may individually insertable and extractable for replacement or maintenance. In addition, appropriate power converter(s) are selected and used for the renewable power source(s) 30 that are operated at favorable climate conditions, thereby generating abundant and stable electricity productions.

Figure 6A:
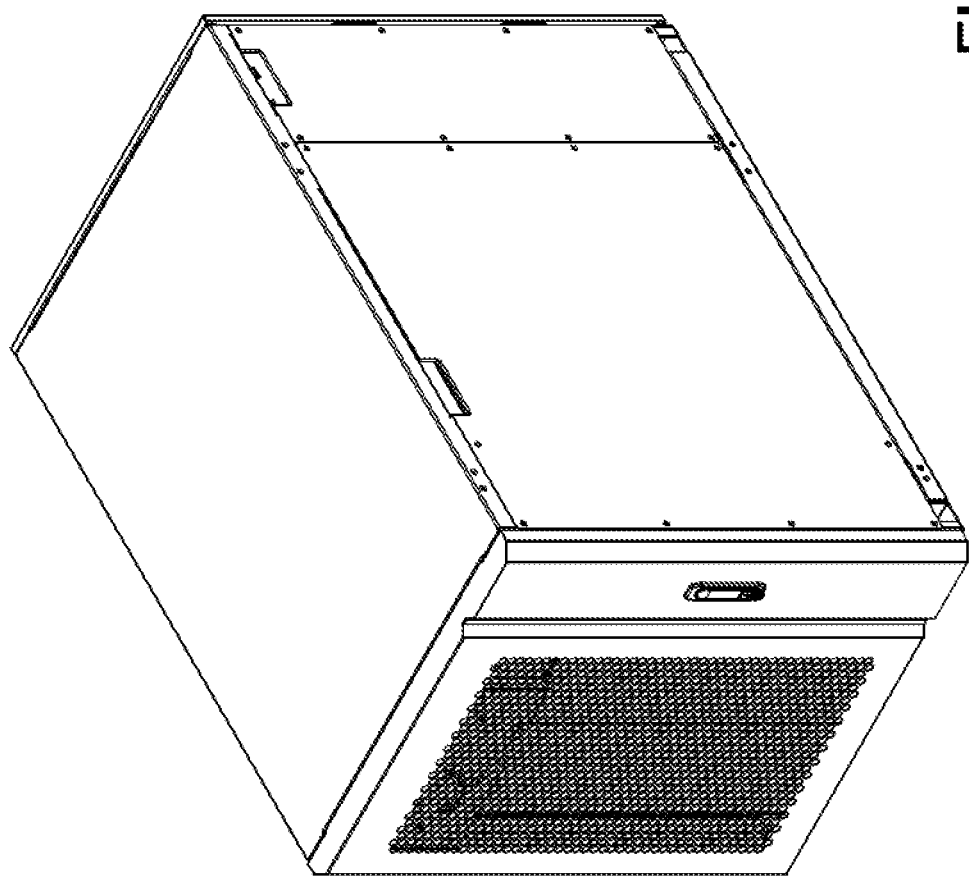
FIG. 6A is a perspective appearance view of the NanoGrid system according to the first embodiment of the present disclosure.
Figure 6B:
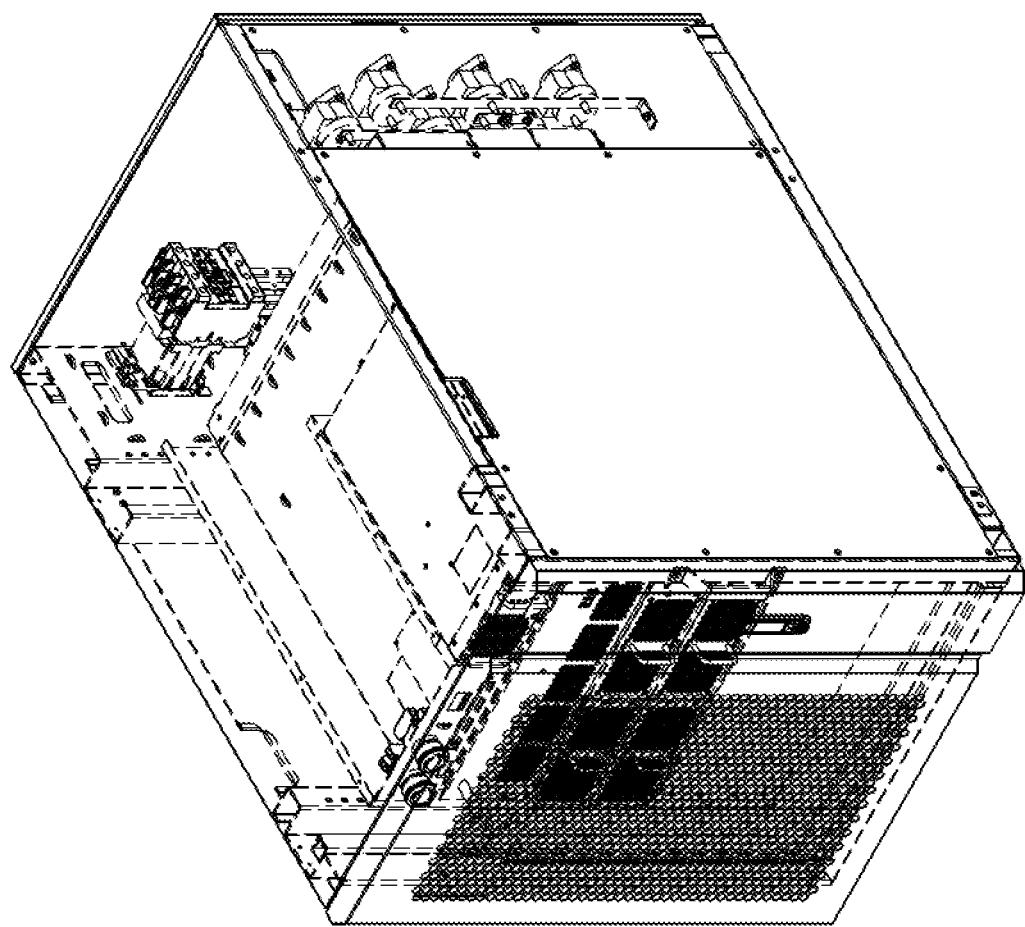
FIG. 6B is a perspective view of the NanoGrid system according to the first embodiment of the present disclosure.

Please refer to FIG. 6A and FIG. 6B, which show a three-dimensional appearance view and a perspective view of the hardware configuration of NanoGrid 10 according to the first embodiment of the present disclosure, respectively. Preferably, the first type of NanoGrid 10 is housed in the cabinet with dimension of, for example but not limited to, 620 mm(W)×600 mm(H)×1000 mm(D).

Figure 6C:
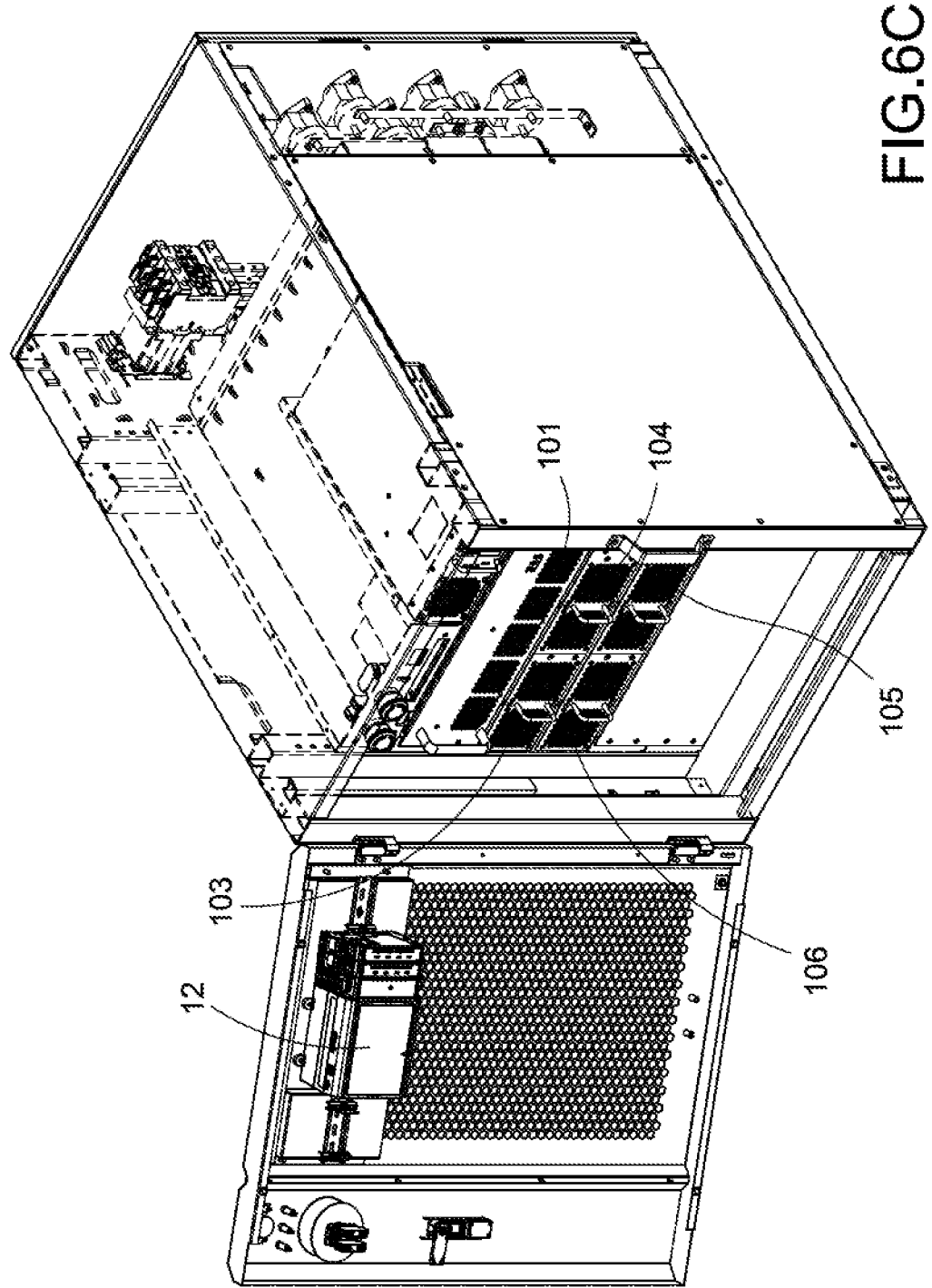
FIG. 6C is another perspective view of the NanoGrid system according to the first embodiment of the present disclosure.

Please refer to FIG. 6C, which shows another perspective view of the hardware configuration of NanoGrid 10 according to the first embodiment of the present disclosure. These power converters including the DC/DC converters and the AC/DC converter are individually insertable and extractable, and installed in the predetermined spaces of the cabinet. In particular, two conductive pins including one positive-polarity pin and one negative-polarity pin constitute the DC busbar 11. In this embodiment, the controller 12 is installed on an inner surface of a front door of NanoGrid 10, and the controller 12 is contained in a limited available space of the cabinet after the front door is closed.

Figure 6D:
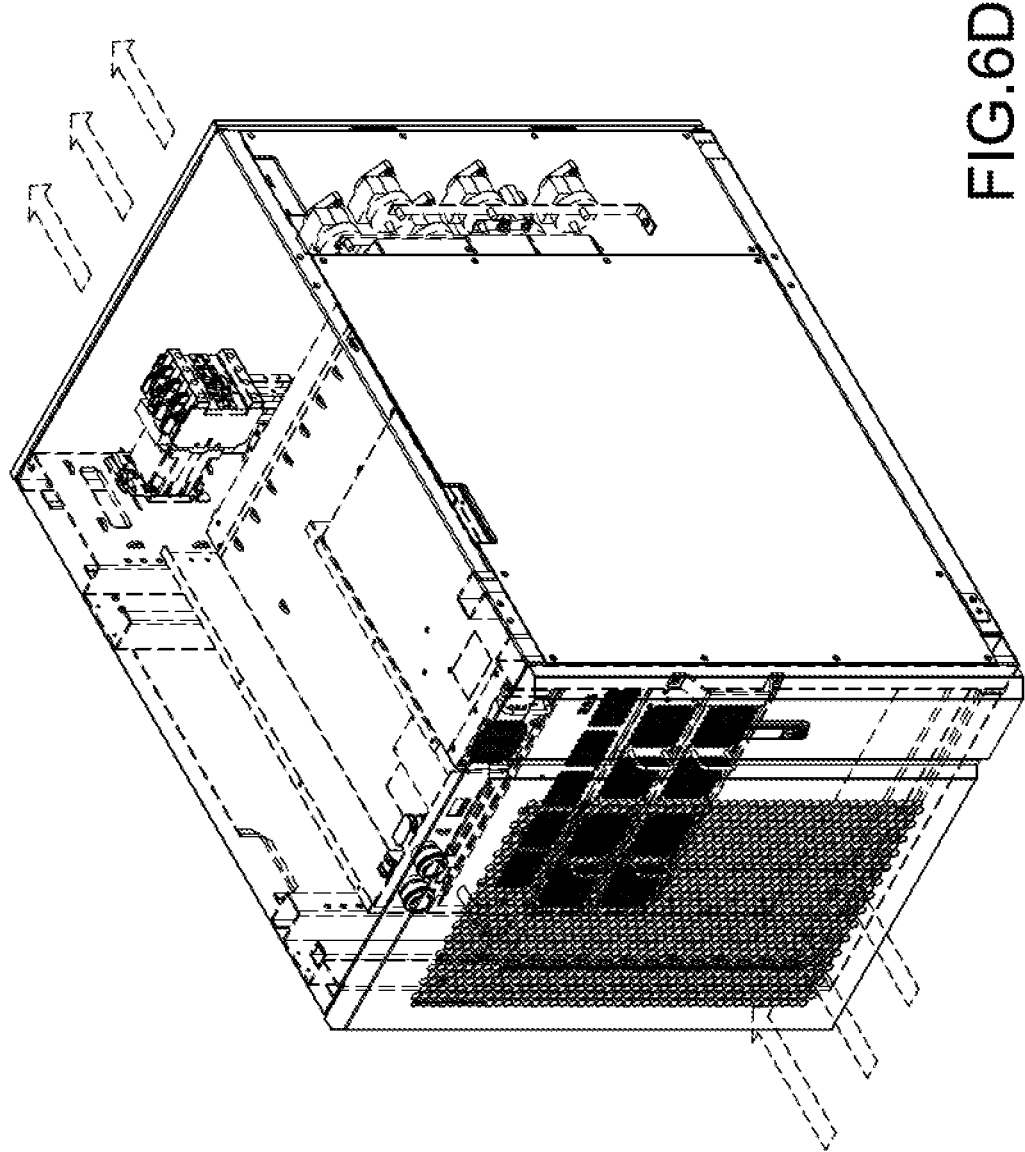
FIG. 6D is further another perspective view of the NanoGrid system according to the first embodiment of the present disclosure.

Please refer to FIG. 6D, which shows further another perspective view of the hardware configuration of NanoGrid 10 according to the first embodiment of the present disclosure. FIG. 6D shows an air inlet and an air outlet, and a reflow direction of the air flow is from the air inlet to the air outlet (in the arrow direction). In this embodiment, the air inlet is away from the DC busbar 11 and the air outlet is near to the DC busbar 11.

Preferably, the second type of NanoGrid 10 is housed in a cabinet having a plurality of shelves with dimension of, for example but not limited to, 620 mm(W)×880 mm(H)×1000 mm(D). A power grid converter 101, namely the 50 kW bi-directional AC/DC converter is installed in the cabinet, and available space of the power grid converter 101 is designed to be with dimension of, for example but not limited to, 17 in(W)×3 U(H)×28 in(D), where 1 U (one unit) is equal to 1.75 inches (44.45 mm). In addition, six predetermined spaces are one-column perpendicularly designed to install a plurality of power converters, such as a solar converter 104, a wind converter 105, and a geothermal converter 106 for different renewable power sources 30 and a battery converter 103 for the rechargeable battery.

More specifically, the selection of the solar converter 104, the wind converter 105, the geothermal converter 106 or other renewable power converters may depend on actual needs or beneficial climatic conditions so that the NanoGrid 10 optimizes performance. For example, the selection of the solar converter 104 in the NanoGrid 10 is beneficial for the region with sufficient sunlight and a large amount of sunshine. Similarly, the selection of the wind converter 105 in the NanoGrid 10 is beneficial for the region with a large amount of wind. Therefore, as shown in FIG. 1, the controller 12, the power grid converter 101, and the busbar converter 102 are necessary; the solar converter 104, the wind converter 105, the geothermal converter 106, and the battery converter 103 are optional.

Figure 7:
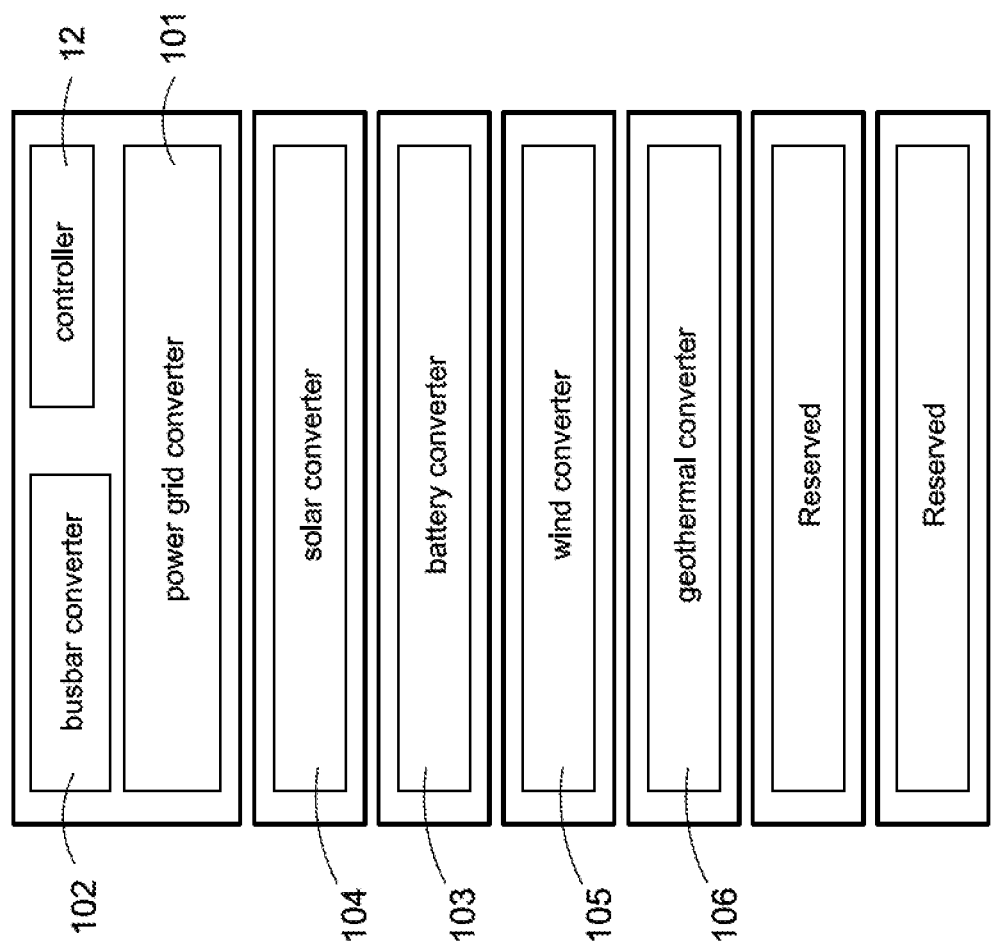
FIG. 7 is a schematic block diagram of the NanoGrid system according to a second embodiment of the present disclosure.

As shown in FIG. 7, for example, four 2 U-height power converters are provided for the solar energy source, the wind energy source, the geothermal energy source, and the rechargeable battery, respectively. In this embodiment, the battery converter 103 for the rechargeable battery is a 50 kW bi-directional DC/DC converter, and other converters, including the solar converter 104, the wind converter 105, and the geothermal converter 106 for these renewable power sources 30 are single-directional DC/DC converters. In addition, two predetermined spaces are reserved or two DC/DC converters installed in the two predetermined spaces are reserved for other renewable power sources 30. Therefore, the high of the second type of the cabinet (shown in FIG. 7) containing the NanoGrid 10 is higher than that of the first type of the cabinet (shown in FIG. 5) containing the NanoGrid 10 at least 6 U.

Moreover, another predetermined space is designed to install a busbar converter 102, namely the 10 kW DC/DC converter for DC loads in the household. Also, the controller 12 is housed in the limited available space of the cabinet.

In this embodiment, each of the power converters including the DC/DC converters and the AC/DC converter may individually insertable and extractable for replacement or maintenance. In addition, appropriate power converter(s) are selected and used for the renewable power source(s) 30 that are operated at favorable climate conditions, thereby generating abundant and stable electricity productions.

Figure 8A:
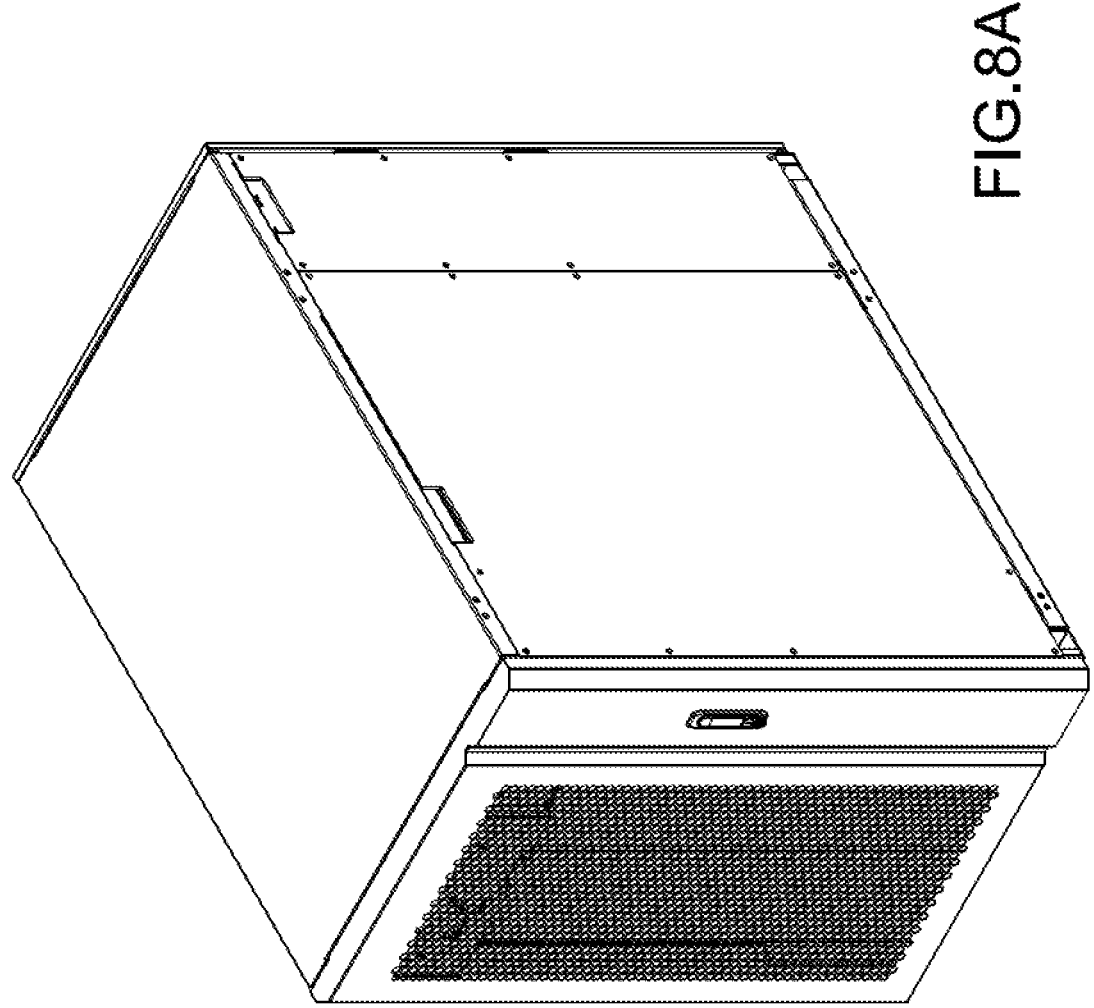
FIG. 8A is a perspective appearance view of the NanoGrid system according to the second embodiment of the present disclosure.
Figure 8B:
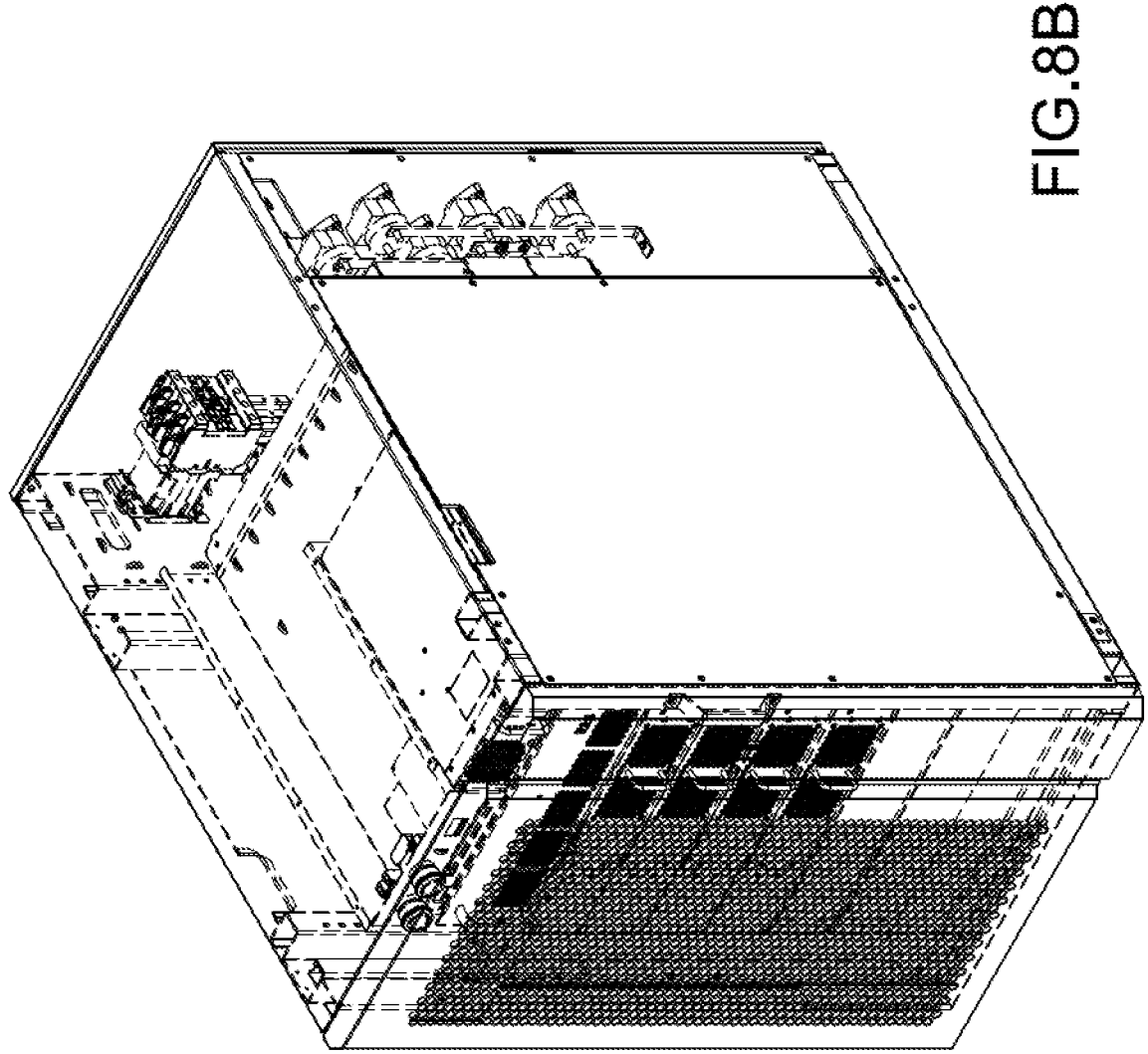
FIG. 8B is a perspective view of the NanoGrid system according to the second embodiment of the present disclosure.

Please refer to FIG. 8A and FIG. 8B, which show a three-dimensional appearance view and a perspective view of the hardware configuration of NanoGrid 10 according to the second embodiment of the present disclosure, respectively. Preferably, the second type of NanoGrid 10 is housed in the cabinet with dimension of, for example but not limited to, 620 mm(W)×880 mm(H)×1000 mm(D).

Figure 8C:
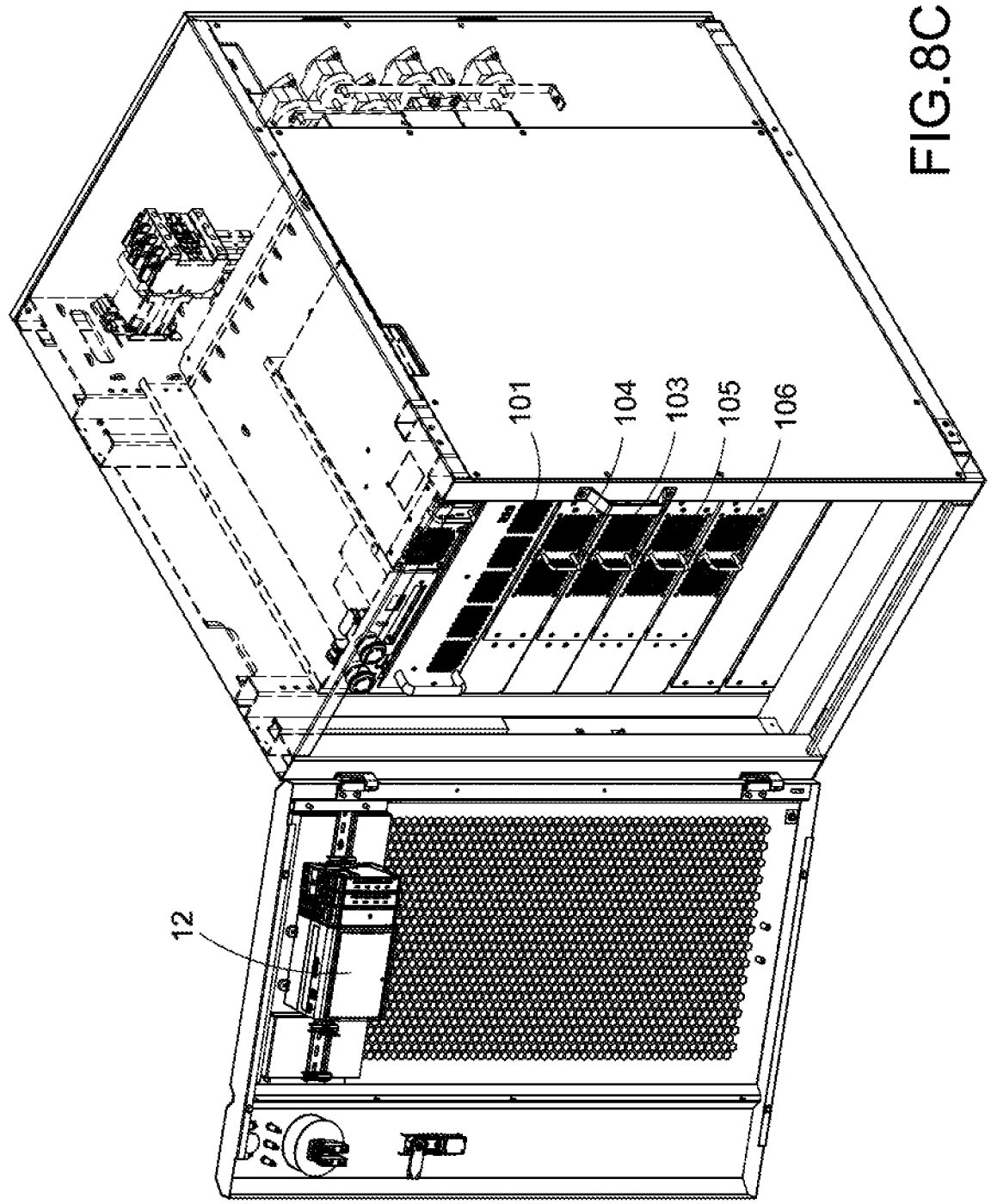
FIG. 8C is another perspective view of the NanoGrid system according to the second embodiment of the present disclosure.

Please refer to FIG. 8C, which shows another perspective view of the hardware configuration of NanoGrid 10 according to the second embodiment of the present disclosure. These power converters including the DC/DC converters and the AC/DC converter are individually insertable and extractable, and installed in the predetermined spaces of the cabinet. In particular, two conductive pins including one positive-polarity pin and one negative-polarity pin constitute the DC busbar 11. In this embodiment, the controller 12 is installed on an inner surface of a front door of NanoGrid 10, and the controller 12 is contained in a limited available space of the cabinet after the front door is closed.

Figure 8D:
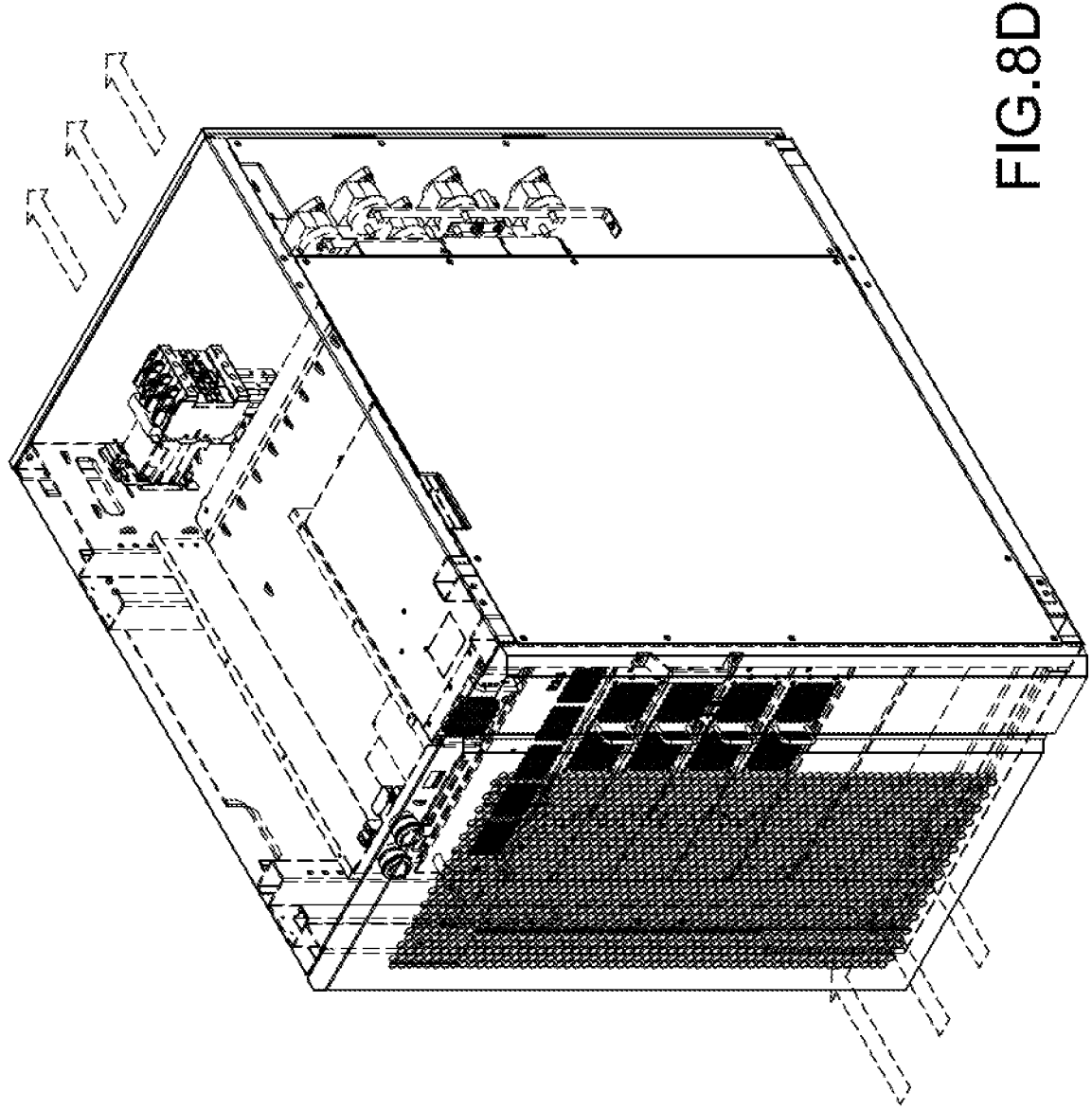
FIG. 8D is further another perspective view of the NanoGrid system according to the second embodiment of the present disclosure.

Please refer to FIG. 8D, which shows further another perspective view of the hardware configuration of NanoGrid 10 according to the second embodiment of the present disclosure. FIG. 8D shows an air inlet and an air outlet, and a reflow direction of the air flow is from the air inlet to the air outlet (in the arrow direction). In this embodiment, the air inlet is away from the DC busbar 11 and the air outlet is near to the DC busbar 11.

Moreover, the height of the power grid converter 101, namely the 50 kW bi-directional AC/DC converter can be reduced from 3 U to 2 U regardless of the first type of NanoGrid 10 or the second type of NanoGrid 10, thereby minimizing the size of NanoGrid 10.

In the present disclosure, NanoGrid 10 could be applied to either a three-phase AC transformer or a single-phase AC transformer. The (three-phase or single-phase) AC transformer 23 may be installed inside the AC distribution panel, and the AC transformer 23 is designed to transform a three-phase AC input source and a single-phase AC input source. For example, the AC transformer 23 is 480-volt three-phase four-wire (480V, 3P4 W), or the AC transformer 23 is 277-volt single-phase two-wire (277V, 1P2 W).

Figure 9A:
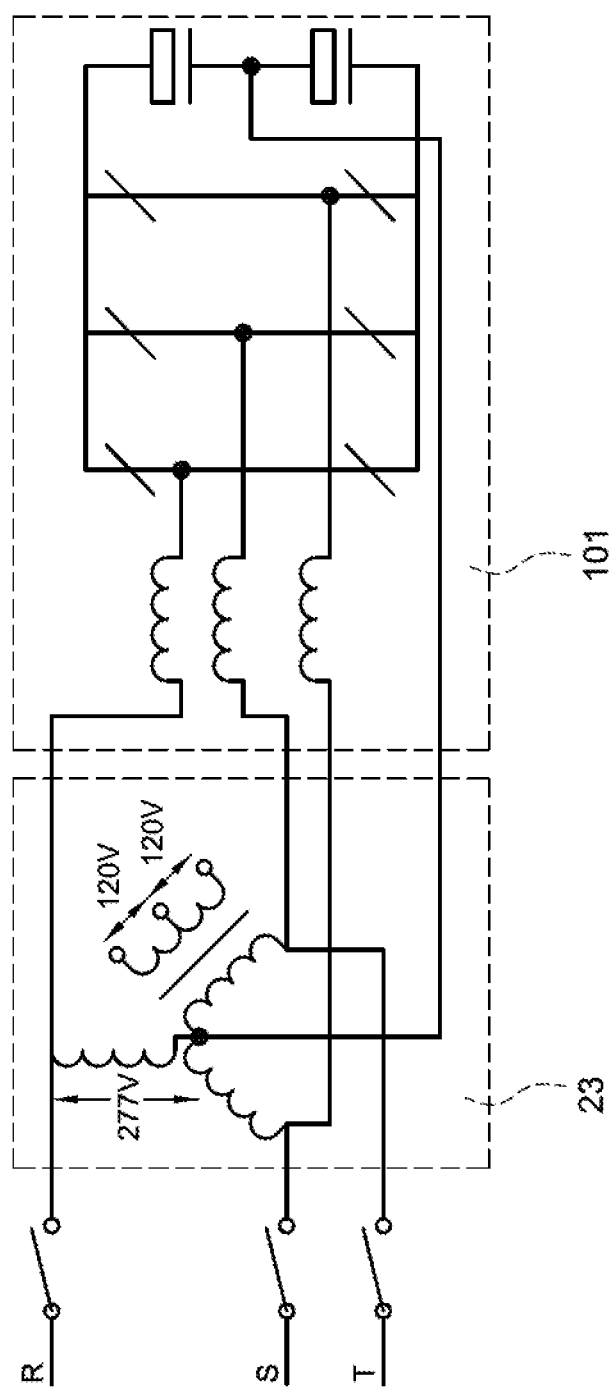
FIG. 9A is a circuit diagram of a three-phase AC transformer applied to the NanoGrid system according to the present disclosure.

Please refer to FIG. 9A, which shows a circuit diagram of a three-phase AC transformer applied to the NanoGrid according to the present disclosure. Also refer to FIG. 1 and FIG. 2, in one embodiment, the power grid converter 101, namely the 50 kW bi-directional AC/DC converter is connected to the 3P4 W AC transformer through three input inductors. The power grid converter 101 provides a three-leg six-switch topology, and the three legs are correspondingly connected to three phases (R-S-T phases) of the three-phase AC input source (power grid side). Also, each switch may be, for example but not limited to, a 600-volt IGBT, and the three-leg six-switch topology can implement a three-level half-bridge operation.

Figure 9B:
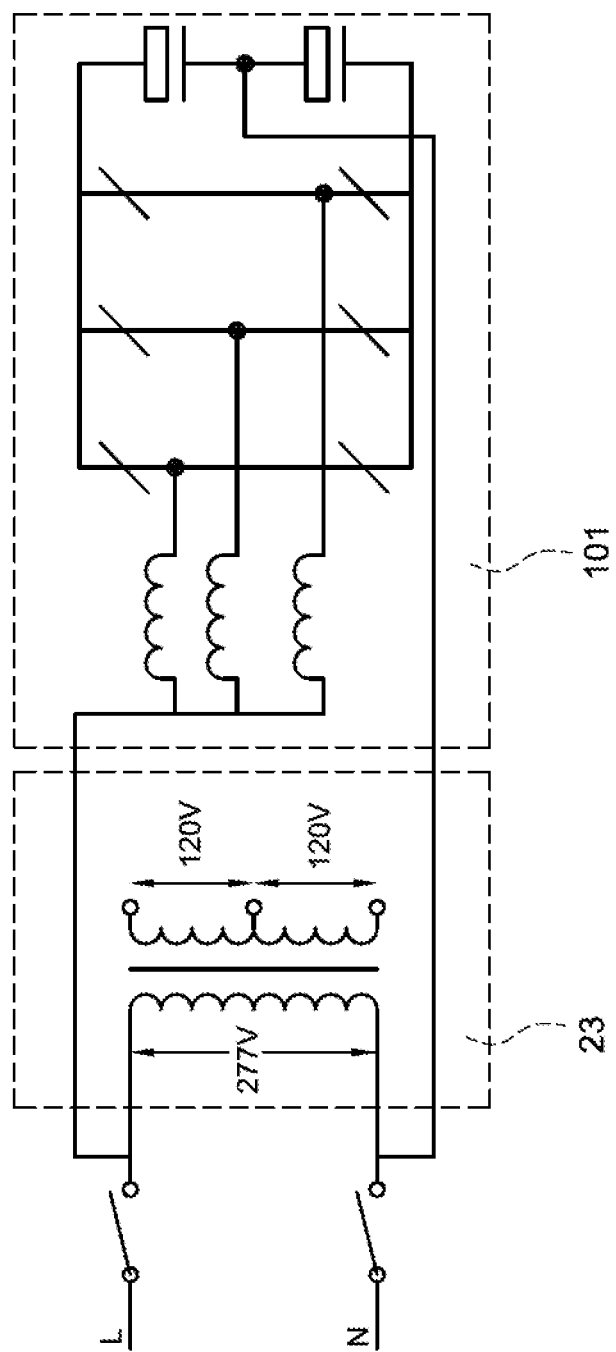
FIG. 9B is a circuit diagram of a single-phase AC transformer applied to the NanoGrid system according to the present disclosure.

Please refer to FIG. 9B, which shows a circuit diagram of a single-phase AC transformer applied to the NanoGrid according to the present disclosure. Also refer to FIG. 1, in one embodiment, the power grid converter 101, namely the 50 kW bi-directional AC/DC converter is connected to the 1P2 W AC transformer through three input inductors. In particular, three input ends of the three input inductors are connected to each other to form a common connection end, and then the common connection end is connected to a fire wire (L) of the single-phase AC input source (power grid side), and a neutral point of the power grid converter 101 is connected to a neutral wire (N) of the single-phase AC input source, thereby applying the power grid converter 101 to the single-phase AC input source. Accordingly, the power grid converter 101 can be either applied to the three-phase AC input source through the 3P4 W AC transformer or the single-phase AC input source through the 1P2 W AC transformer without changing designs of circuit components in the power grid converter 101. Also, both the voltage rating and the current rating of the circuit components can meet requirements for three-phase and single-phase AC input sources.

As shown in FIG. 9A, one phase winding of the 3P4 W AC transformer can be utilized to create an auxiliary winding. For example, the T-phase winding of the 3P4 W AC transformer is utilized to create the auxiliary winding, and therefore generate a 240-volt AC voltage across two ends of the auxiliary winding by a turn ratio of the T-phase winding, namely a voltage level is transformed from 270 277 volts to 240 volts. Accordingly, the 240-volt AC voltage can be provided for supplying AC loads in the household shown in FIG. 1. Also, the 240-volt AC voltage could be divided into two identical 120-volt AC voltages by a center tap of the auxiliary winding.

Similarly, as shown in FIG. 9B, the 240-volt AC voltage can be generated at a secondary side of the winding of the 1P2 W AC transformer by a turn ratio between a primary side and the secondary side of the winding, namely a voltage conversion from 270 277 volts to 240 volts. Accordingly, the 240-volt AC voltage can be provided for supplying AC loads in the household shown in FIG. 1. Also, the 240-volt AC voltage could be divided into two identical 120-volt AC voltages by a center tap of the winding.

In conclusion, the present disclosure has following features and advantages:

1. The scale of the power electricity supplied from the integrated power supply system is increased without changing the architecture of the integrated power supply system if the number of the households in a residential building is added.

2. The block start box plays a significant role to provide the black start mechanism for bootstrapping the power grid into operation once the power grid is not available.

3. The safe DC voltage, which is less than or equal to 60 volts, supplied from wall sockets in each household meets requirements of certain safety standards.

4. The power grid, the renewable power sources, and the rechargeable battery are integrated to increasing reliability of the integrated power supply system.

5. According to the priority of power electricity feeding into and being drawn from the DC bus, the controller controls the power grid, the renewable power sources, and the rechargeable battery to monitor, control, and regulate the busbar voltage of the busbar.

6. The renewable power sources 30 has the high priority to feed the DC electricity into the busbar, thereby lowering generation costs and increasing utilization of renewable power sources.

7. When the busbar voltage of the busbar is substantially maintained and the amount of the DC electricity drawn from the busbar by the loads in the households is relatively little, the rechargeable battery could be charged as full as possible for emergency backup electricity.

8. Each of the power converters including the DC/DC converters and the AC/DC converter may individually insertable and extractable for replacement or maintenance.

9. The power grid converter can be either applied to the three-phase AC input source through the 3P4W AC transformer or the single-phase AC input source through the 1P2W AC transformer without changing designs of circuit components in the power grid converter.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An integrated power supply system, comprising:
   a grid power source;
   at least one renewable power source;
   a rechargeable battery assembly;
   a DC bus;
   a bi-directional AC-to-DC converter, coupled to the grid power source and the DC bus;
   at least one first DC-to-DC converter, coupled to the at least one renewable power source and the DC bus;
   a bi-directional DC-to-DC converter, coupled to the rechargeable battery assembly and the DC bus;
   an AC transformer, coupled to the grid power source and configured to transform a voltage level of the grid power source, and the AC transformer having a delta-connected primary side and a wye-connected secondary side coupled to the bi-directional AC-to-DC converter in a single-phase connection; wherein the bi-directional AC-to-DC converter provides an input common connection end and an output neutral point, and the common connection end and the output neutral point are coupled to one phase of the primary side of the AC transformer, and
   a controller, configured to control power electricity provided from the grid power source, the at least one renewable power source, and the rechargeable battery assembly feeding into and being drawn from the DC bus, thereby keeping a bus voltage of the DC bus substantially fixed at a system voltage.

2. The integrated power supply system in claim 1, further comprising:
   a second DC-to-DC converter, coupled to the DC bus and a DC load and configured to convert the bus voltage into a load voltage for supplying power to the DC load.

3. The integrated power supply system in claim 2, wherein the load voltage is less than or equal to 60 volts.

4. The integrated power supply system in claim 2, wherein the rechargeable battery assembly is configured to supply DC power to the DC load by a power flow route through the bi-directional DC-to-DC converter, the DC bus, and the second DC-to-DC converter.

5. The integrated power supply system in claim 2, wherein the rechargeable battery assembly is configured to supply AC power to an AC load by a power flow route through the bi-directional DC-to-DC converter, the DC bus, and the bi-directional AC-to-DC converter.

6. The integrated power supply system in claim 1, wherein when the bus voltage is less than a first threshold voltage, the controller is configured to control the at least one first DC-to-DC converter with the highest priority converting the at least one renewable power source into the power electricity feeding into the DC bus; wherein the first threshold voltage is less than the system voltage.

7. The integrated power supply system in claim 6, wherein when the bus voltage is less than the first threshold voltage, the controller is configured to control the bi-directional DC-to-DC converter with the second high priority converting output power of the rechargeable battery assembly into the power electricity feeding into the DC bus.

8. The integrated power supply system in claim 6, wherein when the bus voltage is less than a second threshold voltage, the controller is configured to control the bi-directional AC-to-DC converter converting the grid power source into the power electricity feeding into the DC bus; wherein the second threshold voltage is less than the first threshold voltage.

9. The integrated power supply system in claim 1, whether the integrated power supply system is contained in a cabinet, and the bi-directional DC-to-DC converter and the at least one first DC-to-DC converter are disposed in two-column arrangement and insertable and extractable.

10. The integrated power supply system in claim 1, whether the integrated power supply system is contained in a cabinet, and the bi-directional DC-to-DC converter and the at least one first DC-to-DC converter are disposed in one-column arrangement and insertable and extractable.

11. The integrated power supply system in claim 1, wherein the secondary side of the AC transformer is coupled to the bi-directional AC-to-DC converter in a three-phase connection.

12. The integrated power supply system in claim 1, wherein at least one winding of the secondary side of the AC transformer is used to create an auxiliary winding, and a voltage of the auxiliary winding is less than a voltage of the at least one winding.

13. The integrated power supply system in claim 1, further comprising:
    a cloud-based energy management system, connected to the controller in a wireless manner or in a wired manner and configured to receive real-time electricity information provided from the controller.

14. The integrated power supply system in claim 1, wherein the at least one renewable power source is a solar energy source, a wind energy source, a geothermal energy source, or a hydraulic energy source.

15. The integrated power supply system in claim 1, wherein the integrated power supply system is applied to supply power to residential buildings or electric vehicles.

* * * * *